(12) United States Patent
Kim et al.

(10) Patent No.: US 8,131,219 B2
(45) Date of Patent: Mar. 6, 2012

(54) OPERATION METHOD AND DEVICE FOR INTEGRATED MODEM HAVING PLURALITY OF MODEMS

(75) Inventors: Ho Joong Kim, Yongin-si (KR); Rae Jin Uh, Seoul (KR); Bo Seung Hwang, Yongin-si (KR); Jae Dong Jung, Seongnam-si (KR); Ju Young Jung, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 431 days.

(21) Appl. No.: 12/399,337

(22) Filed: Mar. 6, 2009

(65) Prior Publication Data
US 2009/0233552 A1 Sep. 17, 2009

(30) Foreign Application Priority Data
Mar. 14, 2008 (KR) ........................ 10-2008-0023725

(51) Int. Cl.
*H04B 17/00* (2006.01)
*H04B 1/38* (2006.01)
(52) U.S. Cl. ............. 455/62; 455/66; 455/572; 375/222

(58) Field of Classification Search ............... 710/1, 7, 710/20; 375/220, 222; 455/66, 62, 571, 455/572, 556.1
See application file for complete search history.

(56) References Cited

U.S. PATENT DOCUMENTS

| | | | |
|---|---|---|---|
| 6,711,162 B1* | 3/2004 | Ortega et al. | 370/389 |
| 7,319,715 B1* | 1/2008 | Souissi et al. | 375/220 |
| 7,480,327 B2* | 1/2009 | Davis et al. | 375/222 |
| 7,694,001 B2* | 4/2010 | Burdick et al. | 709/228 |
| 2003/0081665 A1* | 5/2003 | Tokairin | 375/222 |

FOREIGN PATENT DOCUMENTS
KR 2007060184 * 6/2007
KR 10-2007-0076093 A 7/2007
* cited by examiner

*Primary Examiner* — Dinh T. Le
(74) *Attorney, Agent, or Firm* — Jefferson IP Law, LLP

(57) ABSTRACT

An operation method and device for an integrated modem having a plurality of modems is provided. The method includes connecting the integrated modem to a mobile terminal, supplying, by the mobile terminal, power to each modem of the integrated modem, performing booting each modem to maintain a ready-on state, and controlling to operate a modem selected according to an input signal from an input unit while terminating supplying of power to the non-selected modem or maintaining the booting completion state.

18 Claims, 5 Drawing Sheets

OPERATION METHOD AND DEVICE FOR INTEGRATED MODEM HAVING PLURALITY OF MODEMS

PRIORITY

This application claims the benefit under 35 U.S.C. §119 (a) of a Korean patent application filed in the Korean Intellectual Property Office on Mar. 14, 2008 and assigned Serial No. 10-2008-0023725, the entire disclosure of which is hereby incorporated by reference.

BACKGROUND OF THE INVENTION

1. Field of the Invention

The present invention relates to an operation method and device for an integrated modem having a plurality of modems. More particularly, the present invention relates to an operation method and device for an integrated modem having a plurality of modems that is capable of performing a process of supplying power to each modem and booting for a rapid conversion between modems, in a process of operating the plurality of modems.

2. Description of the Related Art

Currently, a mobile terminal is easy to carry, capable of storing various programs, and has various functions such that it is used in many fields. Mobile communications terminals are widely used due to a characteristic of voice communications during movement, such that the number of users and service subscribers has increased. When such a mobile terminal was at an early stage of development, its size was very large for the stabilization of a battery and other devices. Thus, the weight and size of the mobile terminal was too large to be called a hand-held device. However, recently, due to development of the battery and other devices, the weight and size have become light and small, while the thickness of the mobile terminal has also become thin. That is, a current mobile terminal has characteristics of being light and compact.

The above-described mobile terminal also provides an external interface by which the mobile terminal is able to unite with peripheral devices to provide various services. For example, the mobile terminal may provide a Universal Serial Bus (USB) interface to support a connection of a USB device such that a service limit of the mobile terminal can be supplemented.

Recently, an integrated type modem having a plurality of modems, which is a specific USB device to be connected to the mobile terminal, has been developed and commercialized. Accordingly, it is necessary that a proper operation method thereof is developed.

SUMMARY OF THE INVENTION

An aspect of the present invention is to address at least the above-mentioned problems and/or disadvantages and to provide at least the advantages described below. Accordingly, an aspect of the present invention is to provide an operation method and device for an integrated modem having a plurality of modems that are capable of enhancing an effectiveness of power use and providing a proper operation of each modem of the integrated modem, while providing a rapid response to a user through the proper operation of each modem.

In accordance with an aspect of the present invention, a device for operating an integrated modem having a plurality of modems is provided. The device includes an integrated modem having a plurality of modems, and a mobile terminal connected to the integrated modem, wherein the mobile terminal supplies power to the plurality of modems, and controls to perform a booting of each modem.

In accordance with another aspect of the present invention, a method of operating an integrated modem having a plurality of modems is provided. The method includes connecting the integrated modem to a mobile terminal, supplying, by the mobile terminal, power to each modem of the integrated modem, and performing a booting of each modem.

As described above, an exemplary operation method and device for an integrated modem having a plurality of modems according to the present invention are capable of providing a rapid response to a user and effectiveness of power use through a proper power control.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
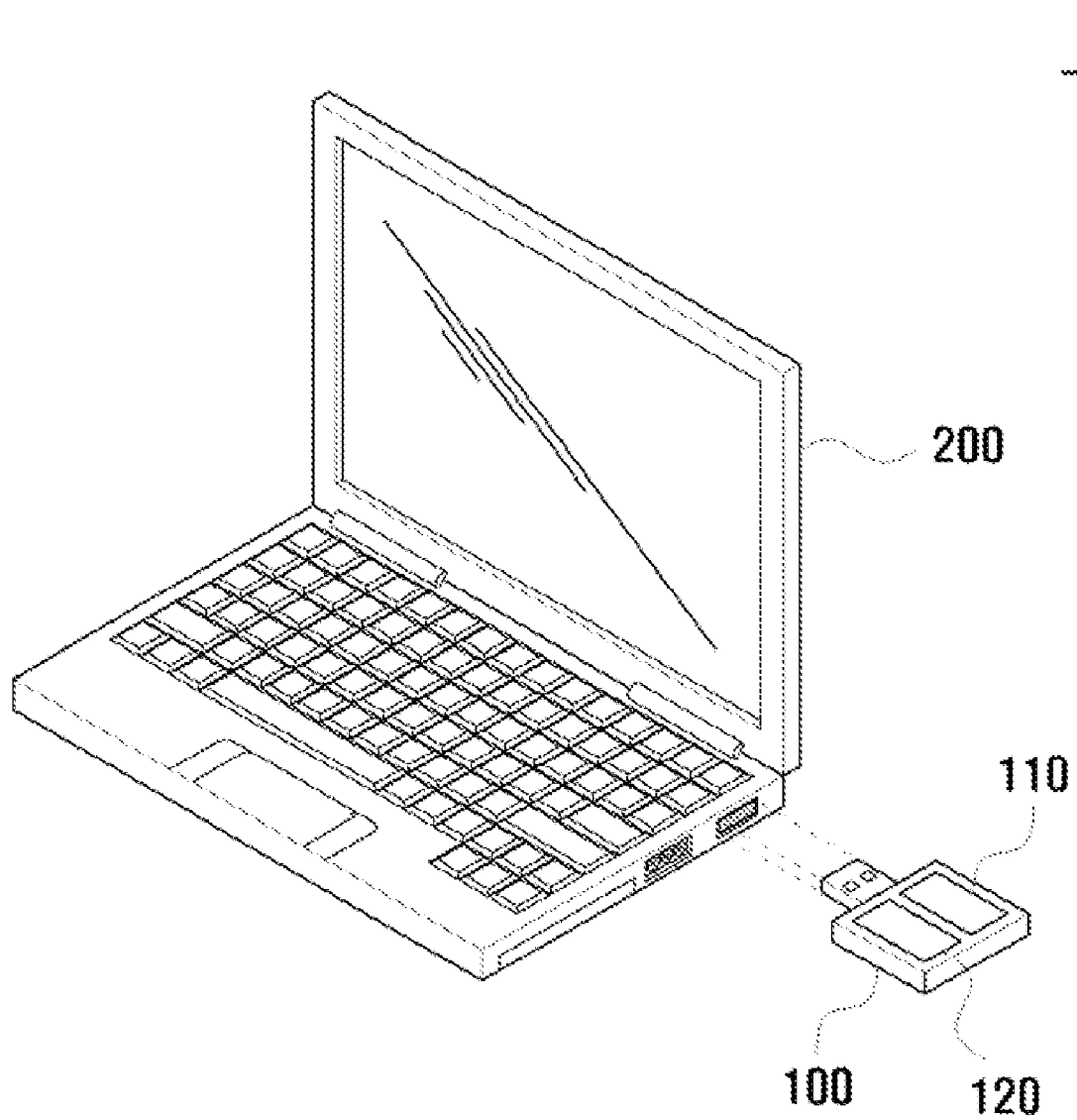
FIG. 1 is a diagram illustrating an integrated modem operation device including a mobile terminal connecting to an integrated modem according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, detailed descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, an integrated modem of exemplary embodiments of the present invention is described as a WiBro communications device and a High Speed Downlink Packet Access (HSDPA) communications device that are connected to a USB interface of a mobile terminal. However, various communications devices, including a WiMax communications device, a Bluetooth communications device, a Wideband Code Division Multiple Access (WCDMA) communications device, a Wireless Local Area Network (WLAN) communications device, and a Code Division Multiple Access (CDMA) communications device, can also be used as a modem applied in exemplary embodiments of the present invention.

Moreover, the modem of exemplary embodiments of the present invention may include a device for transceiving a signal by communicating with a mobile terminal, including a memory device for storing a signal transceived with the mobile terminal. In exemplary embodiments, the terminal to which the above-described integrated modem is connected is exemplified as a notebook, but is not limited thereto. The mobile terminal can be, for example, a mobile phone, a Personal Digital Assistant (PDA), or a mobile game machine. Moreover, in exemplary embodiments of the invention, the integrated modem can be an external device having an interface that can be connected to the mobile terminal, such as a USB device of dongle type.

Hereinafter, a mobile terminal and an integrated modem connected to the mobile terminal are described with reference to FIG. 1, and a control method and control system of the integrated modem having a plurality of modems are described thereafter. The plural modems included in the integrated modem described below are exemplified as two modems.

FIG. 1 is a diagram illustrating an integrated modem operation device including a mobile terminal and an integrated modem that can be connected to an external interface of the mobile terminal according to an exemplary embodiment of the present invention.

Referring to FIG. 1, an integrated modem operation device 10 of an exemplary embodiment of the present invention includes an integrated modem 100 having a first modem 110 and a second modem 120, and a mobile terminal 200 that controls the activation of the first and second modems 110, 120, respectively, when connected to the integrated modem 100. When the integrated modem 100 is connected to an external interface of the mobile terminal 200, the mobile terminal 200 supplies power to the first and second modems 110, 120 and performs a booting operation thereof.

Then, the integrated modem operation device 10 activates at least one of the first modem 110 and the second modem 120 under the control of the mobile terminal 200 according to a preset control, and can collect information, such as radio environment information, provided by the first modem 110 and the second modem 120. Accordingly, the integrated modem operation device 10 can operate the first modem 110 and the second modem 120 included in the integrated modem 100 individually and independently under the control of the mobile terminal 200. Hereinafter, configurations of the mobile terminal 200 and the integrated modem 100 are described in detail with reference to the attached drawings.

Figure 2:
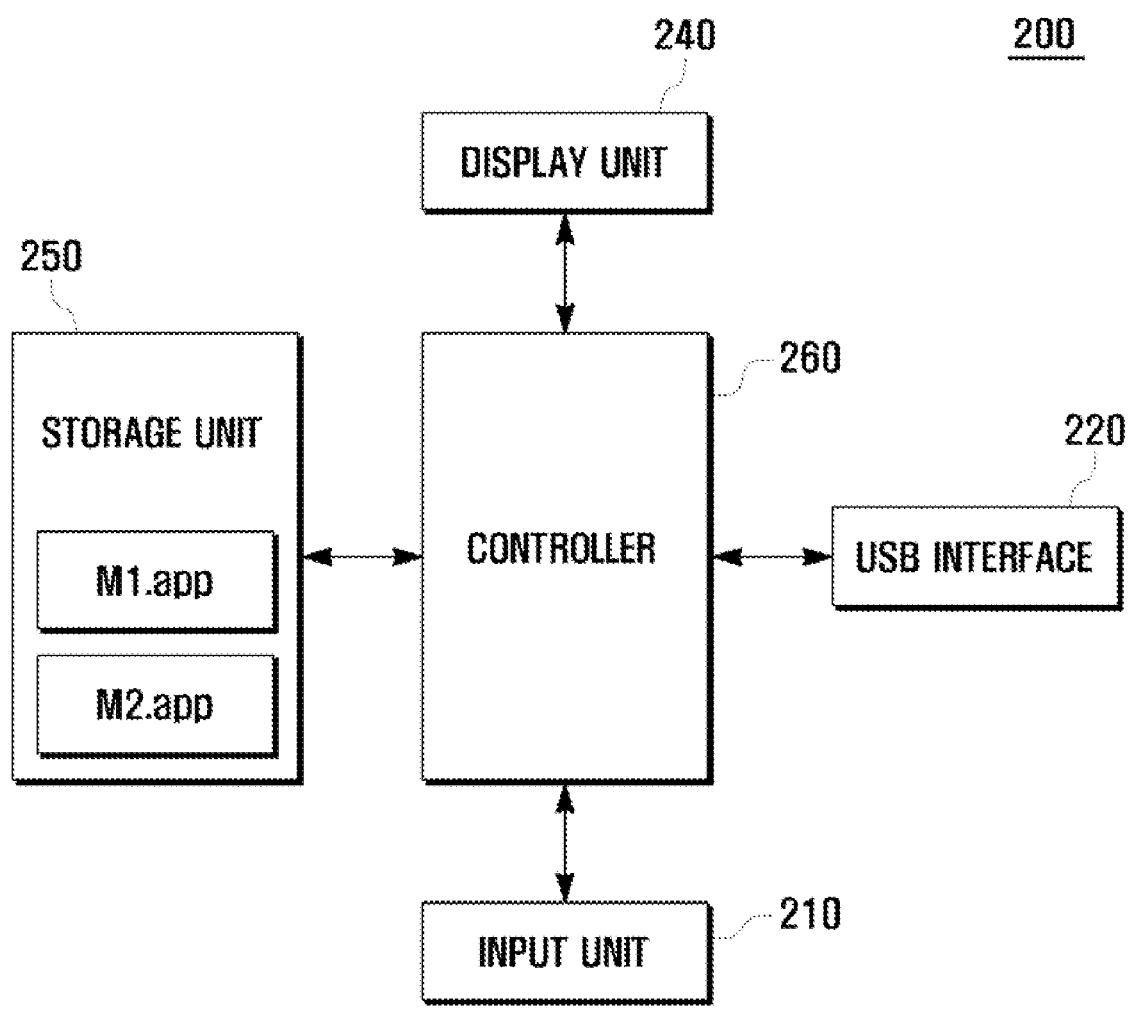
FIG. 2 is a block diagram schematically illustrating an exemplary configuration of the mobile terminal of FIG. 1.

FIG. 2 is a block diagram schematically illustrating an exemplary configuration of the mobile terminal 200. Hereinafter, it is assumed that the mobile terminal 200 is a mobile communications terminal.

Referring to FIG. 2, the mobile terminal 200 includes an input unit 210, an external interface 220, a display unit 240, a storage unit 250 and a controller 260. In an exemplary embodiment as illustrated, the external interface 220 is embodied as a USB interface. If the integrated modem 100 is connected to the USB interface 220, the mobile terminal 200 controls the activation of the first modem 110 and the second modem 120 included in the integrated modem 100 such that the function supported by the first modem 110 and the second modem 120 can be provided to a user. At this time, the mobile terminal 200 is able to control to simultaneously supply power to the first modem 110 and the second modem 120 for a rapid activation thereof, while performing the booting operation.

The mobile terminal 200 may further include an audio processing unit (not shown) for replaying audio files and a radio frequency unit (not shown) for performing communications with the outside.

The input unit 210 includes multiple input keys and function keys for receiving number and character information and setting various functions. The function keys may include a direction key, a side key, and a shortcut key that are set in order to perform a specific function. The input unit 210 generates a key signal relating to a user setting and the function control of the mobile terminal 200, and transmits the signal to the controller 260. More particularly, when the integrated modem 100 is connected, the input unit 210 generates a selection signal for selecting one of the first modem 110 and the second modem 120 according to modes thereof corresponding to a user input, an input signal for connecting to a corresponding communications service by utilizing the selected modem, and an input signal for terminating the communications service, and transmits the input signal to the controller 260.

Although, in this exemplary embodiment, the external interface of the invention is exemplified as the USB interface 220, the external interface may be formed with various types, such as a common pin type, a jack connection type, and the like.

The USB interface 220 is connected to the integrated modem 100 and supplies power to the integrated modem 100 under the control of the controller 260. In addition, the USB interface 220 performs the booting of the first modem 110 and the second modem 120, and transceives a signal so as to perform communications with a modem that has completed the booting. The USB interface 220 has a shape to which a connector formed in the integrated modem 100 can be connected, and includes a power line for supplying power, a ground line, a first signal line, and a second signal line for communications.

The display unit 240 displays a screen showing the progress of a process according to the activation of the integrated modem 100, a screen for the modem selection, a user data requested by a user, and an additional function screen. The display unit 240 further displays a default screen of the mobile terminal 200, that is, a stand-by screen, and can display a menu screen and information stored in the storage unit 250 under the control of the controller 260. Here, the display unit 240 can be formed with a Liquid Crystal Display (LCD) or the like. In a case that the display unit 240 is formed with a panel having a touch screen function, the display unit 240 is able to function as an input unit.

In an exemplary implementation, when the integrated modem 100 is connected to the USB interface 220, the display unit 240 of the invention displays a message or an icon to indicate the normal connection. Further, the display unit 240 displays, under the control of the controller 260, a list of modes that selectively use the first and second modems 110 and 120 of the integrated modem 100, for example, a first mode using the first modem 110, a second mode using the second modem 120, and a third mode that is controlled to use the first modem 110 first and then the second modem 120 according to a condition.

When the list of modes is displayed, if the input unit 210 selects a specific mode, the display unit 240 displays an activation process for a corresponding mode. Here, the display unit 240 can display information of a wireless communications environment that can be formed by the first and second modems 110 and 120, for example, a display of signal reception intensity with an additional icon, a message or the like. When the integrated modem 100 is separated from the USB interface 220 of the mobile terminal 200, the display unit 240 can display a message or an icon to alert a user to such a situation. At this time, in an exemplary implementation, the display unit 240 may temporarily display an alarm message or an icon notifying the separation.

The storage unit 250 stores an operation system for booting of the mobile terminal 200, and application programs for each function of the mobile terminal 200, for example, a file playback function, a camera function, and a watching TV function. Moreover, the storage unit 250 stores user data generated through use of the mobile terminal, and data received through a communications channel.

More particularly, the storage unit 250 stores application programs for activating the integrated modem 100. The storage unit 250 may include a program memory and a data memory.

The program memory stores application programs for supporting each function of the mobile terminal 200, and in particular, stores the application programs for supporting the integrated modem 100. For example, if the first modem 110 is a WiBro modem and the second modem 120 is an HSDPA modem, the program memory of the storage unit 250 can store a WiBro application program M1.app and an HSDPA application program M2.app.

When the integrated modem 100 is connected to the USB interface 220, the storage unit 250 can download and store the application programs for using the first modem 110 and the second modem 120 described above from the integrated modem 100, can store the application programs when it is manufactured, or can store a program received through other communications lines. The data memory stores user data such as a phone book, a schedule, a memo, and a message, and stores data according to an activation of the application program stored in the program memory. For example, in a case that the application program M1.app for the first modem 110 and the application program M2.app for the second modem 120 are activated, the data memory can store a signal that is transmitted and received based on a communications channel formed according to the activation of the modems.

The data memory further stores a frequency list of using the first modem 110, that is, a frequency list of using the first modem 110 in a home area and a frequency list of using the first modem 110 in a roaming area, and stores a similar frequency list for using the second modem 120. According to the control of the controller 260, the frequency list can be transmitted to the integrated modem 100 for the operation of the integrated modem 100 through the controller 260. If the integrated modem 100 also has a memory function, the integrated modem 100 can store the above-described frequency list for use.

The controller 260 performs a function of controlling overall operations of the mobile terminal 200 and a signal flow between inner blocks of the mobile terminal 200. When the integrated modem 100 is connected to the USB interface 220, the controller 260 controls to display a process of recognizing the connection of the integrated modem 100, and to display the list of modes according to the modem list included in the integrated modem 100. At this time, the controller 260 supplies power to all modems included in the integrated modem 100, and controls booting of each power-supplied modem. The controller 260 can support all modems that have completed the booting to perform a frequency scan process based on a frequency list set in the corresponding modem. Here, if the power supplied to the integrated modem 100 is limited, the controller 260 disables the process of frequency scanning of the modems that have completed the booting, and displays the list of modes according to the modem list.

The controller 260 can transmit a control signal to a specific modem so as to perform the activation process of the modem, for example, the frequency scan process, according to the selected mode corresponding to the input signal transmitted from the input unit 210 when the list of modes according to the modem list is displayed. The control signal transmission to the integrated modem 100 and control of the integrated modem 100 by the controller 260 is described later in more detail with reference to drawings.

As described above, the mobile terminal 200 of the invention maintains all modems included in the integrated modem 100 connected to the USB interface 220 in a ready-to-use state (hereinafter, a ready-on state). If a user selects a specific mode from the list of modes according to the modem list, the mobile terminal 200 can activate a corresponding application program so as to rapidly support the communications service through the modem corresponding to the selected mode. If the operation of a specific modem is determined, the power supplied to the modem maintaining the ready-on state is discontinued so that the efficiency of power use can be improved.

Figure 3:
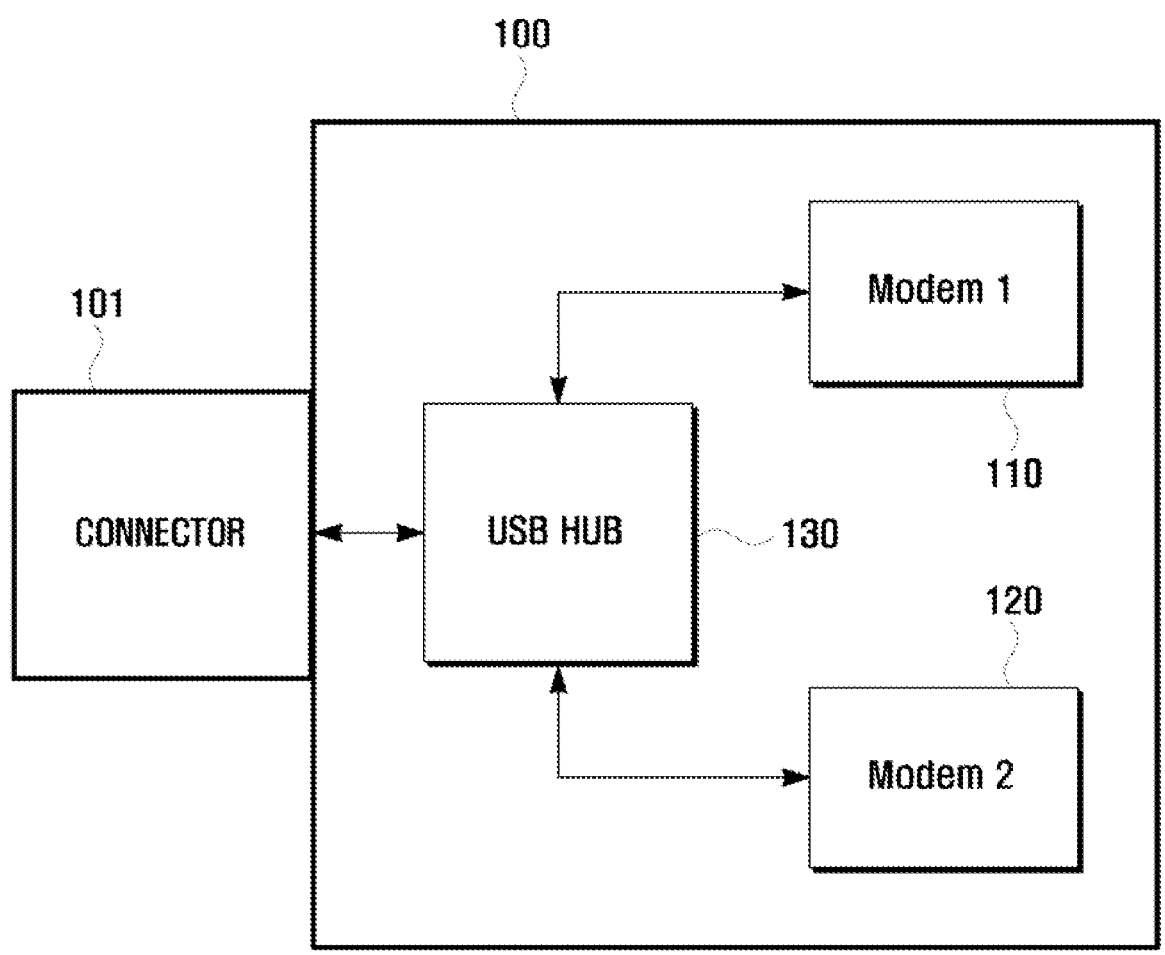
FIG. 3 is a block diagram schematically illustrating an exemplary configuration of the integrated modem of FIG. 1.

FIG. 3 is a block diagram schematically illustrating an exemplary configuration of the integrated modem 100.

In this exemplary embodiment, it is assumed that the integrated modem 100 has two modems, that is, a first modem 110 and a second modem 120. Further, it is assumed that the first modem 110 and the second modem 120, each uses a mobile communications network having different characteristics. For example, the first modem 110 may be a modem corresponding to a WiBro network while the second modem 120 may be a modem corresponding to an HSDPA network. Likewise, the first modem 110 may be a WiMax modem, and the second modem 120 may be a CDMA modem.

Referring to FIG. 3, the integrated modem 100 includes the first modem 110, the second modem 120, a USB hub 130 and a connector 101. The first modem 110 is a module for supporting a specific communications service, and may include, for example, configurations for individually supporting the WiBro communications service. The first modem 110 stores the WiBro application program for activating the WiBro communications service, to enable the first modem 110 to deliver the WiBro application program to the mobile terminal 200 when connected to the mobile terminal 200.

The first modem 110 includes an interface for connecting to the mobile terminal 200 through the USB hub 130 and the connector 101, and includes configurations for individually operating the WiBro application program. For example, the first modem 110 includes an Input/Output (IO) bus, a memory, including a Read Only Memory (ROM) and a Random Access Memory (RAM), that is connected to the IO bus and stores an operation system and the WiBro application program, a control processor that controls transceiving of a signal for booting the first modem 110 and providing a corresponding communications service by controlling each configuration connected to the IO bus, and an antenna for WiBro.

The second modem 120 may include configurations for individually supporting a communications service having characteristics different than those of the communications service supported by the first modem 110, for example, the HSDPA communications service. Similarly to the first modem 110, the second modem 120 stores the HSDPA application program for activating the HSDPA communications service, to enable the second modem 120 to deliver the HSDPA application to the mobile terminal 200 when connected to the mobile terminal 200.

The second modem 120 includes an interface for connecting to the mobile terminal 200 through the USB hub 130 and the connector 101, and includes configurations for individually operating the HSDPA application program. For example, the second modem 120 includes an IO bus, a memory, including a ROM and a RAM, that is connected to the IO bus and stores an operation system and the HSDPA application program, a control processor that controls transceiving of a signal for booting the second modem 120 and providing a corresponding communications service by controlling each configuration connected to the IO bus, and an antenna for HSDPA.

The USB hub 130 supplies power to the first modem 110 and the second modem 120 under the control of the mobile terminal 100, controls transceiving of a signal among the first modem 110, the second modem 120 and the mobile terminal 100, and supports booting of the first modem 110 and the second modem 120. The USB hub 130 includes a signal line for transceiving a signal from and to the first modem 110 and a power line for supplying power thereto, and a signal line for transceiving a signal from and to the second modem 120 and a power line for supplying power thereto, and controls the connection between one of the first modem 110 and the second modem 120, and the mobile terminal 100.

The connector 101 delivers a signal and power supplied from the mobile terminal 200 to the USB hub 130 when connected to the USB interface 220 of the mobile terminal 200. The integrated modem 100 thereby supplies power supplied from the mobile terminal 200 to the first modem 110 and the second modem 120, and performs the booting of each modem under the control of the mobile terminal 200.

When the integrated modem 100 selects and uses one of the first modem and the second modem, the integrated modem 100 can terminate supplying of the power to the non-selected modem, or can maintain a ready-on state while not substantially operating the non-selected modem. That is, for modems included in the integrated modem 100 to be used according to a selection of the mobile terminal 200, a scan process is performed by using a preset frequency list. Thereafter, the communications are performed based on a selected frequency, wherein a modem that is not selected can receive power and can maintain the ready-on state when the booting is completed. Here, the power supply can be blocked to the modem that is not selected according to the control of the mobile terminal 100.

In the integrated modem 100 of this exemplary embodiment, the USB hub 130 may be provided to supply power to the first modem 110 and the second modem 120, and to perform the booting operation thereof. However, in another exemplary embodiment, the above-described USB hub can be omitted, and the first modem 110 and the second modem 120 can be directly connected to the mobile terminal 200 through the connector 101 and controlled by the mobile terminal 200. In detail, the mobile terminal 200 can perform Inter Processing Communication (IPC) communications with the first modem 110 and the second modem 120 when connected thereto through the connector 101.

That is, the mobile terminal 200 provides a connection line directly connected to the first modem 110 and the second modem 120 included in the integrated modem 100, and performs, through the connection line, a direct control for the power supply, the booting of each modem, the frequency scan and the communications operation. In the configuration of the integrated modem 100 of the present exemplary embodiment, the USB hub 130 is configured to perform the communications control between the mobile terminal 200 and each modem. However, a direct control by the mobile terminal 200 can be performed without the USB hub 130.

Hereinafter, an operation method of the above-described integrated modem operation device is described in detail with reference to the drawings.

Figure 4:
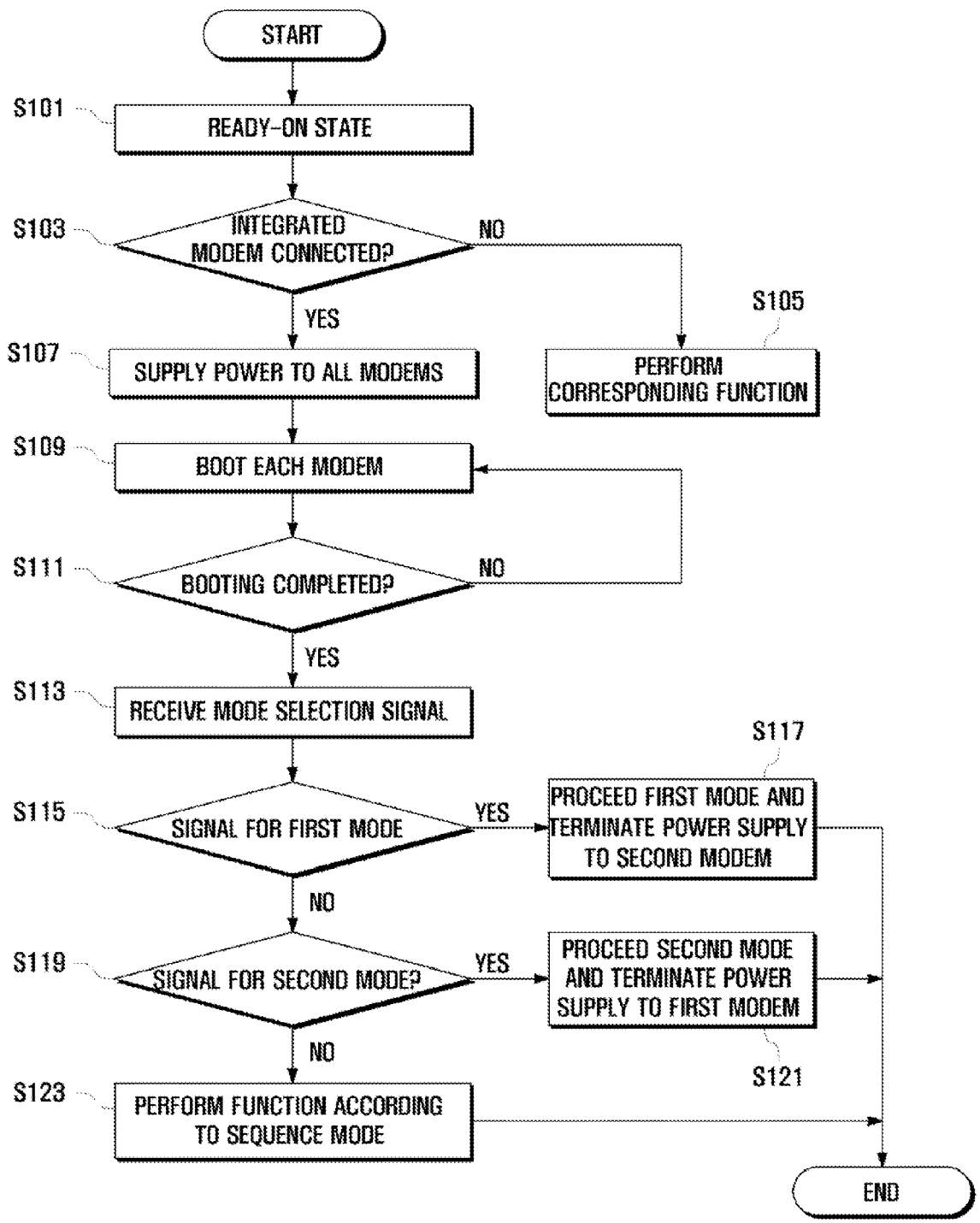
FIG. 4 is a flowchart illustrating an integrated modem operation method according to an exemplary embodiment of the present invention.

FIG. 4 is a flowchart illustrating an integrated modem operation method according to an exemplary embodiment of the present invention.

The integrated modem 100 includes the first modem 110 and the second modem 120. Accordingly, a first mode is a mode in which communication is performed using the first modem 110, and a second mode is a mode in which communication is performed using the second modem 120.

Referring to FIG. 4, in an integrated modem operation method of an exemplary embodiment of the invention, the mobile terminal enters a ready-on state in step S101. The controller 260 then determines the integrated modem 100 is connected to the mobile terminal 200 through the connector 101 in step S103.

If the integrated modem 100 is not connected to the mobile terminal 200, the controller 260 performs a corresponding function of mobile terminal 200, for example, a file playback function, an activation function of various applications programs, and, in a case of having a broadcasting reception module, a broadcasting receiving function.

If the integrated modem 100 is connected to the mobile terminal 200 at step 103, the controller 260 controls to supply power to all modems included in the integrated modem 100 in step S107.

The mobile terminal 200 can supply the power by securing power lines to the first modem 110 and the second modem 120 through the USB hub 130 when the USB hub 130 is included in the integrated modem 100, or by securing a direct connection line to the first modem 110 and the second modem 120 when the integrated modem does not include a USB hub, and using IPC communication. The mobile terminal then supports a booting process of each modem of the integrated modem 100 in step S109. At this time, when the power is supplied, the first modem 110 and the second modem 120 included in the integrated modem 100 can perform the booting process with a corresponding booting program that is already integrated in each modem. Alternatively, in a case where the booting program is already stored in the mobile terminal 200, the booting process can be performed based on the booting program stored in the mobile terminal 200.

The mobile terminal 200 determines whether the booting process of each modem is completed in step S111. When the booting process is completed at step S111, the mobile terminal 200 waits to receive a mode selection signal from the input unit 210 in step S113. In an exemplary implementation, the mobile terminal 200 may display a list of modes corresponding to each modem included in the integrated modem so as to select a mode. That is, the mobile terminal 200 displays a list containing a first mode for selecting and operating the first modem, a second mode for selecting and operating the second modem, and a sequence mode for selecting the first modem to enable a frequency scan, and, if the frequency scan fails due to an inappropriate situation, selecting the second modem 120 to display a list corresponding to a sequence mode to enable the frequency scan.

Here, an inappropriate situation is a state in which a communication cannot be performed through the first modem 110, and may be a state where the strength of a communications service signal that can be supported by the first modem 110 becomes weak.

When a signal for the mode selection is received at step S113, the controller 260 of the mobile terminal 200 determines whether the signal includes a signal for a selection of the first mode in step S115. If the signal received from the input unit 210 of the mobile terminal 200 includes a signal for selection of the first mode, the mobile terminal 200 performs the first mode and terminates supplying power to the second modem 120. The first mode is a mode that performs a frequency scan by using a preset frequency list for the first modem 110 and supports a corresponding communications service by selecting a suitable frequency from the scanned frequencies.

In contrast, at step S115, if the input signal received from the input unit 240 does not include a signal for selection of the first mode, the controller of the mobile terminal determines whether the input signal includes a signal for a selection of the second mode in step S119. If the input signal includes a signal for selection of the second mode, the mobile terminal 200 performs the second mode and terminates supplying power to the first modem 110. Similarly to the first mode, the second mode is a mode that performs a frequency scan by using a preset frequency list for the second modem 120 and supports a corresponding communications service by selecting a proper frequency from the scanned frequency.

At step S119, if the input signal does not include a signal for selection of the second mode, the mobile terminal 200 performs a function according to the sequence mode in step S123. A process of performing the function according to the sequence mode of step S133 is illustrated in detail later with reference to FIG. 5. In the mode selection process of the above described process, it is described only that a signal for one of a first mode, a second mode, and a sequence mode is received to proceed. However, in a case that a signal corresponding to termination is generated during the process, the mobile terminal 200 will terminate the mode process and may return to step S101.

As described above, when the integrated modem is connected to the mobile terminal, the integrated modem operation method according to an exemplary embodiment of the present invention supplies power simultaneously to the first modem and the second modem, and immediately performs the booting process of both modems, thereby maintaining the ready-on state for using each modem. Accordingly, the integrated modem operation method of an exemplary embodiment of the invention can support a rapid operation according to the modem selection by maintaining each modem with the ready-on state for immediate use while more efficiently controlling the use of the power by terminating the power supplied to the modem that is not selected.

Figure 5:
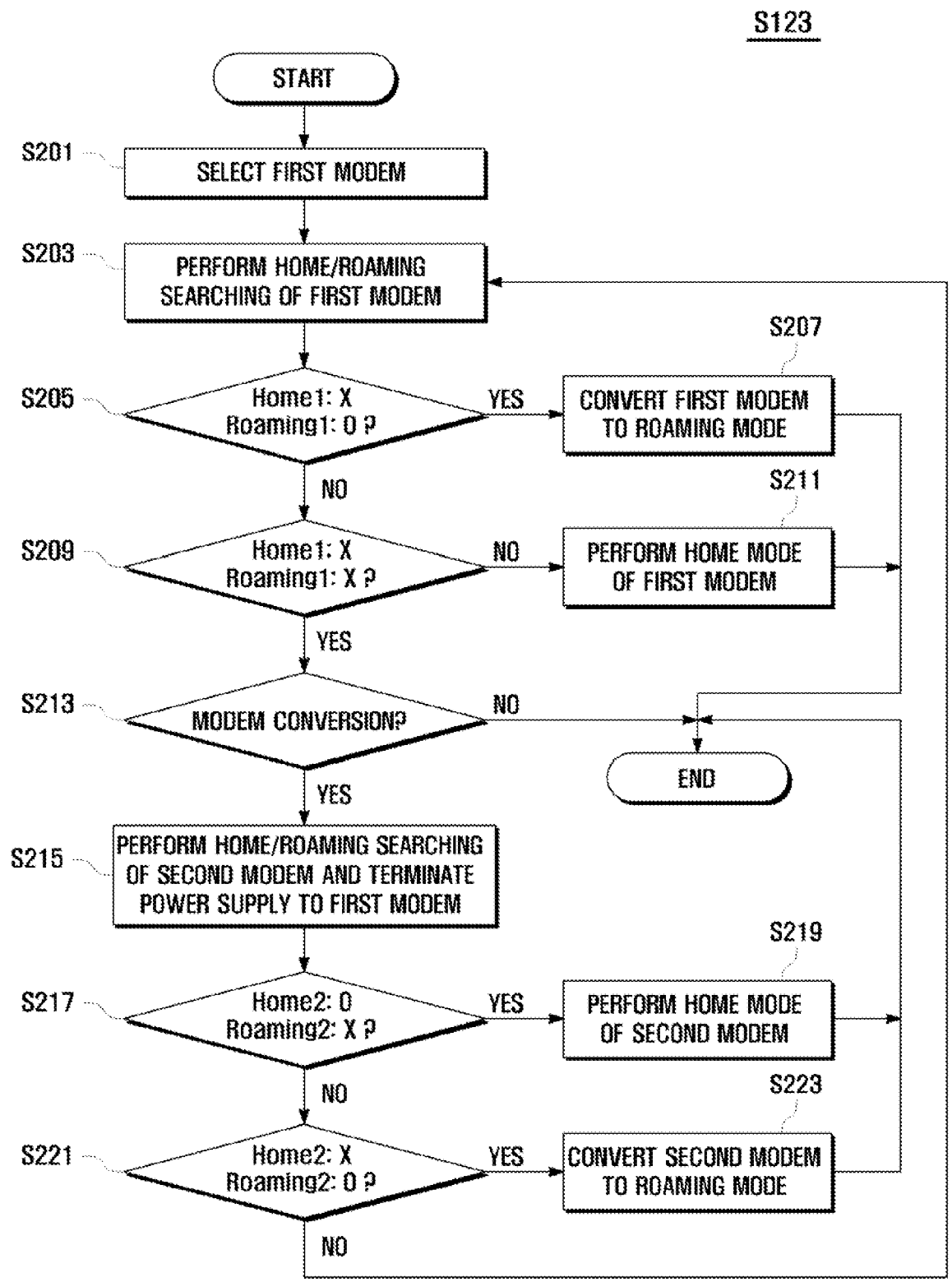
FIG. 5 is a flowchart illustrating an exemplary process of performing a function in the method of FIG. 4 in greater detail.

FIG. 5 is a flowchart illustrating an exemplary process of performing a function in the method of FIG. 4. Hereinafter, the function performance of a function in the sequence mode selects the first modem preferentially. However, in another exemplary embodiment, the second modem could be preferentially selected according to a user setting or to design specification.

Referring to FIG. 5, the mobile terminal 200 selects the first modem 110 for use in step S201, and uses the selected first modem 110 in step S203. That is, the mobile terminal 200 performs a frequency searching operation based on a frequency list that is set in advance for the first modem 110. Here, it is assumed that the preset frequency list includes both a home frequency and a roaming frequency of the first modem 110. Accordingly, at step S203, the mobile terminal 200 performs the frequency searching operation based on the home frequency list of the first modem 110 and the roaming frequency list of the first modem 110.

Upon completion of the frequency searching, if it is determined that the home frequency (Home 1) of the first modem 110 is not available and the roaming frequency (Roaming 1) of the first modem 110 is available in step S205, the mobile terminal 200 converts into the roaming mode of the first modem 110 in step S207. The conversion into roaming mode of the first modem 110 indicates that the mobile terminal uses the first modem and the searched roaming frequency (Roaming1) for the communication service.

If either the home frequency (Home1) of the first modem 110 is available or the roaming frequency (Roaming1) of the first modem 110 is not available at step S205, the mobile terminal 200 determines whether both the home frequency (Home 1) of the first modem 110 and the roaming frequency (Roaming1) of the first modem 110 are not available in step S209. If the home frequency (Home1) of the first modem 110 is available at step S209, whether or not the roaming frequency (Roaming 1) of the first modem 110 is available, the mobile terminal 200 controls the operation of the home mode of the first modem 110 in step S211. That is, the mobile terminal 200 uses the first modem and the home frequency for the communication service.

If both the home frequency (Home 1) of the first modem 110 and the roaming frequency (Roaming 1) of the first modem 110 are not available at step S209, the mobile terminal 200 determines whether a user wants to use the second modem 120 in step S213, by assuming that the mobile terminal 200 is located in a region in which the first modem 110 cannot be used. In order to support this process, the mobile terminal 200 can generate a pop up message for confirming the modem conversion. If the user does not want the modem conversion, the modem operation may terminate the process. In this case, it is preferable that the mobile terminal 200 returns to step S101 and displays the ready-on screen.

If the user inputs a request for the modem conversion through the input unit 210 at step S213, the mobile terminal 200 performs a process for the second modem operation, that is, the frequency searching in step S215. At this time, while preparing the process for operation of the second modem 120, the mobile terminal 200 may use a mode that saves the power supplied to the first modem 110. Here, a power saving mode may include a method for terminating the supply of power to the first modem 110, and a method for controlling not to perform an additional operation, for example, an operation of frequency searching, or the like in a state where the booting of the first modem 110 is completed.

Upon completion of the frequency searching operation, if the home frequency (Home2) of the second modem 120 among the searched frequencies is available and the roaming frequency (Roaming2) of the second modem 120 is not available in step S217, the mobile terminal 200 controls the performance of the home mode of the second modem 120 in step S219. The home mode of the second modem 120 may indicate that, similarly to the home mode performance of the first modem 110 described above, the communications service is supported based on the second modem 120 and the preset home frequency for the second modem 120.

If either the home frequency (Home2) of the second modem 120 is not available or the roaming frequency (Roaming2) of the second modem 120 is available at step S217, the mobile terminal 200 determines home frequency (Home2) of the second modem 120 among the searched frequencies is not available and the roaming frequency (Roaming2) of the second modem 120 is available in step S221. If the home frequency (Home2) of the second modem 120 is not available and the roaming frequency (Roaming2) of the second modem 120 is available, the mobile terminal 200 controls the conversion into the roaming mode of the second modem 120 in step S223. That is, the communications service is supported based on the second modem 120 and the preset roaming frequency for the second modem 120.

If the searched frequency can support neither the home mode nor the roaming mode at step S221, the mobile terminal 200 returns to step S203 and repeats the searching operation based on the frequency that is set up for the first modem 110. Here, the mobile terminal 200 outputs a pop up message for confirming whether the process for the modem operation should be continued so that the user can selectively perform the modem operation. When the mobile terminal 200 returns to step S203, similarly to step S215, the mobile terminal 200 can control to terminate the supply of power to the second modem 120, or can control to perform a power save mode operation that supplies only the power for booting and controls to not perform an additional operation.

As illustrated in the above, the sequence mode according to the exemplary embodiment of the present invention simultaneously searches the home frequency and the roaming frequency among the frequencies that are set in the first modem and the second modem, thereby simplifying the process for the frequency searching. When converting from the first modem 110 to the second modem 120, and when converting from the second modem 120 to the first modem 110, the exemplary embodiment of the present invention supports to save the power supplied to the modem that is not used such that the efficiency of power usage can be improved.

While the present invention has been shown and described with reference to certain exemplary embodiments thereof, it should be clearly understood by those skilled in the art that various changes in form and details may be made therein without departing from the spirit and scope of the invention as defined in the appended claims and their equivalents.

What is claimed is:

1. A device for operating an integrated modem having a plurality of modems, the device comprising:
   an integrated modem having a plurality of modems; and
   a mobile terminal connected to the integrated modem,
   wherein the mobile terminal supplies power to the plurality of modems when the integrated modem is connected to the mobile terminal, and controls to perform a booting of each modem and to search, based on a stored frequency list, a home frequency and a roaming frequency of each modem in the integrated modem.

2. The device of claim 1, wherein the integrated modem comprises one of a connection line for delivering the power supplied from the mobile terminal directly to each modem and a hub for distributing the power supplied from the mobile terminal to each modem.

3. The device of claim 2, wherein the mobile terminal performs, while performing frequency searching by selecting a specific modem of the plurality of modems, one of terminating the supply of the power to modems that are not selected, and maintaining modems that are not selected in a booting completion state.

4. The device of claim 3, wherein, if the frequency searching fails to find an available frequency after performing the frequency searching by selecting the specific modem of the plurality of modems, a frequency searching based on a frequency that is set for a corresponding modem by selecting one of the modems that were not previously selected and terminating the supply of the power to modems that are not newly selected.

5. The device of claim 4, wherein the mobile terminal comprises a display unit for outputting a pop up message for determining whether to select one of the modems that are not selected.

6. The device of claim 3, wherein the mobile terminal selects, if the frequency searching fails to find an available frequency after performing the frequency searching by selecting the specific modem of the plurality of modems, one of the modems that were not previously selected to perform the frequency searching based on a frequency that is set for a corresponding modem, and controls to maintain a modem that is not newly selected in a booting completion state.

7. The device of claim 6, wherein the mobile terminal comprises a display unit for outputting a pop up message for determining whether to select one of the modems that are not selected.

8. A method of operating an integrated modem having a plurality of modems, the method comprising:
   connecting the integrated modem to a mobile terminal;
   supplying, by the mobile terminal, power to each modem of the integrated modem when the integrated modem is connected to the mobile terminal;
   performing a booting of each modem; and
   searching, based on a stored frequency list, a home frequency and a roaming frequency among the plurality of modems in the integrated modem.

9. The method of claim 8, further comprising one of
   terminating, while the mobile terminal performs a frequency searching by selecting a specific modem of the plurality of modems, the supplying of the power to modems that are not selected, and
   maintaining, while the mobile terminal performs a frequency searching by selecting a specific modem of the plurality of modems, modems that are not selected with a booting completion state.

10. The method of claim 9, further comprising:
    selecting, if the frequency searching fails to find an available frequency after performing the frequency searching by selecting the specific modem of the plurality of modems, one of the modems that were not previously selected; and
    performing the frequency searching based on a frequency that is set for the newly selected modem and terminating the supply of power to modems that are not newly selected.

11. The method of claim 10, further comprising outputting, by the mobile terminal, a pop up message for newly selecting one of the modems that were not previously selected.

12. The method of claim 9, further comprising,
    selecting, if the frequency searching fails to find an available frequency after performing the frequency searching by selecting the specific modem of the plurality of modems, one of the modems that were not previously selected; and performing the frequency searching based on a frequency that is set for the newly selected modem, and controlling to maintain modems that are not newly selected in the booting completion state.

13. The method of claim 12, further comprising outputting, by the mobile terminal, a pop up message for newly selecting one of the modems that were not previously selected.

14. The method of claim 8, further comprising:

if a home frequency of the first modem is not available and a roaming frequency of the first modem is available, converting into a roaming mode of the first modem; and performing the roaming mode of the first modem.

15. The method of claim 14, further comprising, if the home frequency of the first modem is available, performing a home mode of the first modem.

16. The method of claim 15, further comprising:

if both the home frequency and the roaming frequency of the first modem are not available, determining whether to convert to a second modem among the plurality of modems; and performing a frequency searching operation based on a home frequency list and a roaming frequency list of the second modem.

17. The method of claim 16, further comprising, if a home frequency of the second modem is available, performing a home mode of the second modem.

18. The method of claim 17, further comprising:

if a home frequency of the second modem is not available and a roaming frequency of the second modem is available, converting into a roaming mode of the second modem; and performing the roaming mode of the second modem.

* * * * *